United States Patent
Manzi et al.

(10) Patent No.: US 8,339,318 B2
(45) Date of Patent: Dec. 25, 2012

(54) RFID UHF ANTENNA AND MATCHING NETWORK EMBEDDED IN DISPOSABLE CONDUCTING COVERS

(75) Inventors: Giuliano Manzi, Graz (AT); Vlatko Kolaric, Graz (AT); Gerald Wiednig, Stainz (AT)

(73) Assignee: NXP B.V., Eindhoven (NL)

( * ) Notice: Subject to any disclaimer, the term of this patent is extended or adjusted under 35 U.S.C. 154(b) by 344 days.

(21) Appl. No.: 12/841,093

(22) Filed: Jul. 21, 2010

(65) Prior Publication Data
US 2012/0019417 A1 Jan. 26, 2012

(51) Int. Cl.
*H01Q 1/38* (2006.01)

(52) U.S. Cl. .............. 343/700 MS; 343/850; 340/572.7; 340/572.1

(58) Field of Classification Search ........... 343/700 MS, 343/850, 860; 340/572.1, 572.7, 572.8
See application file for complete search history.

(56) References Cited

U.S. PATENT DOCUMENTS

| | | | |
|---|---|---|---|
| 7,705,734 B2 * | 4/2010 | Martinelli | 340/572.8 |
| 7,887,755 B2 * | 2/2011 | Mingerink et al. | 422/547 |
| 2005/0263524 A1 * | 12/2005 | Meynier | 220/258.1 |
| 2010/0102967 A1 | 4/2010 | Lee et al. | |
| 2010/0156614 A1 * | 6/2010 | Adstedt et al. | 340/10.42 |

FOREIGN PATENT DOCUMENTS

| | | |
|---|---|---|
| KR | 10 2001 0052681 A | 6/2001 |
| KR | 10 2004 0083038 A | 9/2004 |
| WO | 99/65002 | 12/1999 |

OTHER PUBLICATIONS

G. Marrocco: "The Art of UHF RFID Antenna Design: Impedance Matching and Size-Reduction Techniques," IEEE Antennas and Propagation Mag. Vo. 50, N. 1, pp. 1-21 (Jan. 2008).

* cited by examiner

*Primary Examiner* — Hoang V Nguyen

(57) ABSTRACT

A UHF RFID antenna is integrated into the disposable metal cover of foam, plastic, metal or cardboard containers.

20 Claims, 6 Drawing Sheets

RFID UHF ANTENNA AND MATCHING NETWORK EMBEDDED IN DISPOSABLE CONDUCTING COVERS

BACKGROUND OF THE INVENTION

Radio Frequency Identification (RFID) tag and reader systems operate over a wide range of radio frequencies, including low frequency (LF) applications, high frequency (HF) applications and ultra-high frequency applications (UHF). LF applications typically reside in the range from about 125 to about 148.5 kHz, HF applications typically operate at about 13.56 MHz while UHF applications typically reside in the range from about 300 MHz to about 3 GHz. The "read range" of an RFID tag is typically defined as the distance from which the RFID reader can communicate with the RFID tag. Passive LF and HF applications typically provide only very short read ranges and typically require the RFID reader to be separated from the tag by no more than about 2 centimeters to about 30 centimeters to achieve successful communication. Passive UHF applications typically allow for longer read ranges, enabling RFID tags to be located from about 2 meters to about 12 meters or more for successful communication with an RFID reader. Typically, various environmental factors can detune an RFID tag and modify the operating frequency to potentially affect the power received by the RFID tag. This affects the read range for the RFID tag. For example, RFID tags in the presence of conducting media such as metals and liquids may experience detuning due to absorption or parasitic capacitance. Detuning may also arise from the capacitance spread in the assembly process. For example, if the direct attaching process of the RFID tag to the antenna has a misalignment or an imperfect contact, parasitic capacitance may be introduced.

BRIEF DESCRIPTION OF THE DRAWINGS

FIG. 1b shows a top view of FIG. 1a

DETAILED DESCRIPTION OF THE INVENTION

Figure 1A:
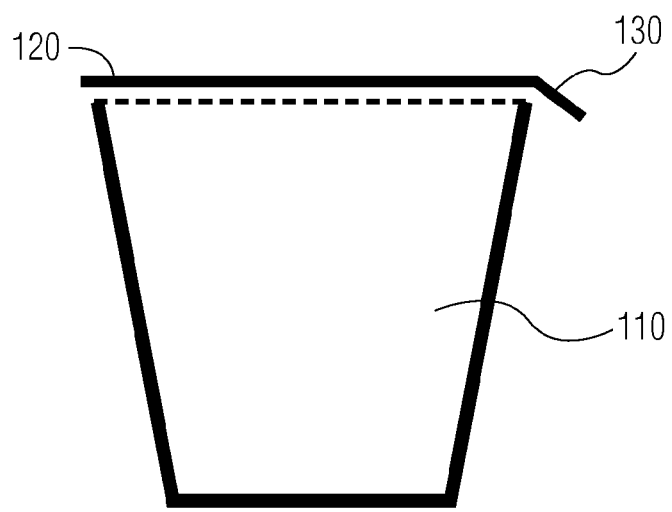
FIG. 1a shows an embodiment in accordance with the invention.
Figure 1B:
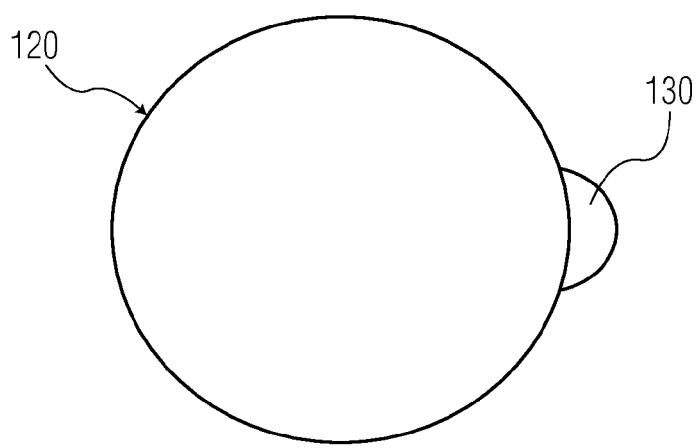

In accordance with the invention, containers having a disposable metal cover, such as, for example, plastic, foam, metal or cardboard cups with a metal foil cover can be RFID tagged by integrating the UHF RFID antenna into the packaging, in particular, disposable metal cover 120 (see FIGS. 1a and 1b). Typical consumer examples of these container types are yogurt cups or dehydrated soup cups. If cup 110 is metal, there may exist resonances between cup 110 and disposable metal cover 120 which effect the resonance frequency of disposable metal cover 120 which operates as a UHF antenna. Having cup 110 made of metal introduces an extra capacitance from disposable metal cover 120 to ground and introduces inductive coupling between cup 110 and UHF RFID matching network 310 (e.g. see FIGS. 3b and 3c). Additionally, if cup 110 is metal, the volume of cup 110 will typically effect the design. Note that the effects of having cup 110 made of metal can typically be mitigated by appropriate design of UHF RFID matching network 310 (e.g. see FIG. 3b) and because the resonance of disposable metal cover 120 which functions as the UHF antenna is typically more than about 50 to about 100 MHz higher than the operating frequency in accordance with the invention. The UHF RFID antenna integrated into disposable metal cover 120 receives power from the RFID reader and that power is used to activate UHF RFID Integrated Circuit (IC) 330 (see FIG. 3b). Typical power output for the RFID reader is on the order of 4 watts and UHF RFID IC 330 (see FIG. 3b) typically needs a power level of −18 dBm for activation in reading mode and typically needs a power level of −15 dBm for activation in write mode. Embodiments in accordance with the invention have typical Q (quality factor) values less than about 20 and the embodiments in accordance with the invention function in both the radiative near field zone and in the radiation zone.

Figure 2:
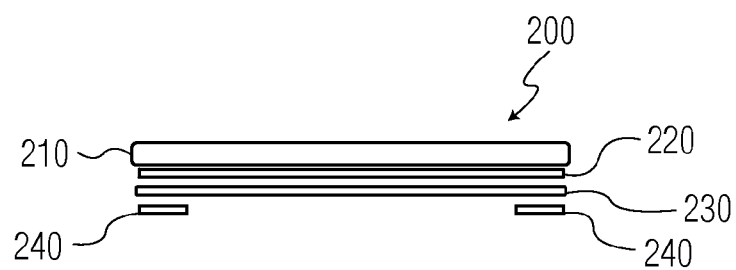
FIG. 2 shows an embodiment in accordance with the invention.

FIGS. 1a and 1b show an exemplary embodiment in accordance with the invention. FIG. 1a shows a cross section of cup 110 affixed with disposable metal cover 120 and metal tab 130. In accordance with an embodiment of the invention, the diameter of disposable metal cover 120 is typically 10 cm or less. Note that in accordance with the invention, disposable metal cover 120 need not be round but may be square, rectangular, octagonal or other suitable geometric shape. Metal tab 130 is typically structurally integrated into disposable metal cover 120. FIG. 1b shows a top view of cup 110 which is typically hidden below disposable metal cover 120 (see FIG. 1a). The material for disposable metal cover 120 typically includes aluminum. In accordance with the invention, disposable metal cover 120 and tab 130 have an RFID tag antenna integrated into them. FIG. 2 shows a cross-section of multilayer structure 200 that is used for disposable metal cover 120 and tab 130. Conducting layer 210 of disposable metal cover 120 and tab 130 is typically made of aluminum, typically thicker than about 5 μm, and is attached using glue layer 220 to insulating substrate 230. In accordance with the invention, insulating substrate 230 is typically made of plastic such as polyethylene terephthalate (PET) but may be made of another suitable insulator and is typically thicker than the skin depth at the operating UHF frequency. Glue layer 220 may be formed by the partial melting of insulating substrate 230 during the lamination process used to create disposable metal cover 120 and tab 130 when a plastic such as PET is used. In accordance with the invention, the laminating process typically combines a sheet of metal or metal foil (e.g. aluminum) with one or more other materials such as paper or plastic (e.g. PET) using a glue, pressure and typically heat for controlling glue viscosity and drying or thermosetting the bonding agent. Four typical methods for laminating aluminum foil are wet bonding, dry pressure or thermoplastic-bonding, extrusion bonding and hot melt bonding.

Insulating substrate 230 is attached to the rim of cup 110 using glue layer 240. Typical thicknesses for insulating substrate 230 are on the order of from about 20 μm to about 100 μm. Glue layer 240 is typically a glue that is suitable for attachment to the rim of cup 110.

Due to the mechanical design of disposable metal cover 130 having insulating substrate 230 coated with conducting layer 210, UHF RFID matching network 310 (see FIG. 3b) may be integrated directly into disposable metal cover 120 and tab 130 by cutting or etching a matching loop formed by arms 128 and 129 into conducting layer 210 on tab 130 and form part of UHF RFID matching network 310. A typical three-dimensional electromagnetic simulation software program used for design of UHF RFID matching network 310 is CST MICROWAVE STUDIO available from COMPUTER SIMULATION TECHNOLOGY OF AMERICA, Inc. 429 Old Connecticut Path, Suite 505, Framingham, Mass. 01701. UHF RFID integrated circuit (IC) 330 (see FIG. 3a) may be directly attached to matching network 310 or to UHF RFID STRAP carrier 520 (see FIG. 5) which is attached to matching network 310.

Figure 3A:
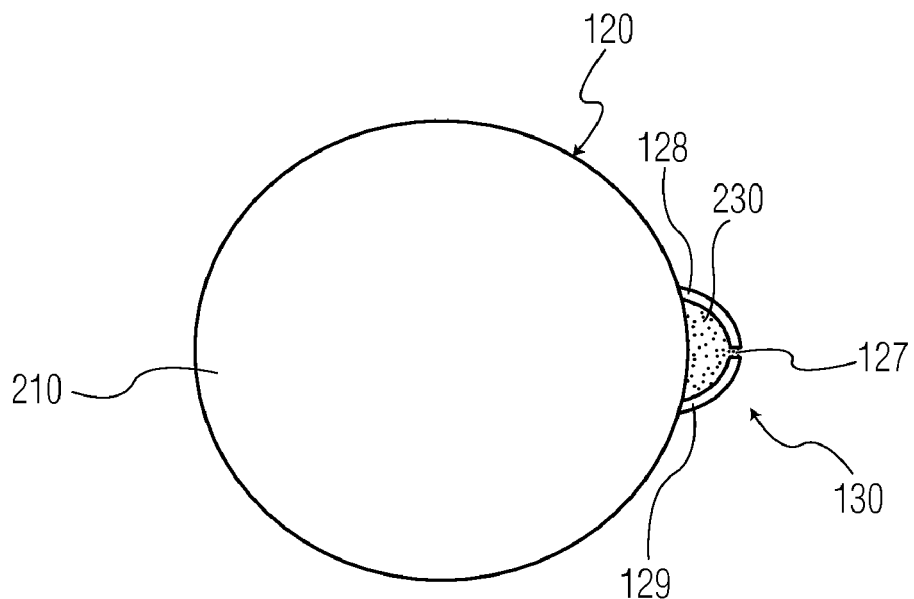
FIG. 3a shows an embodiment in accordance with the invention.

FIG. 3a shows arm 128 and arm 129 of UHF RFID matching network 310 (see FIGS. 3b and 3c) on tab 130. In accordance with an embodiment of the invention, part of metal layer 210 on tab 130 is precisely removed to create arm 128 and arm 129 using an appropriate etchant and mask or other suitable process for the metal used for metal layer 210 and exposing an area of insulating substrate 230 on tab 130. The size of the area enclosed by arm 128 and arm 129 is typically adjusted to provide the desired UHF RFID matching network 310. Note notch 127 in FIG. 3a that is etched or otherwise introduced into metal layer 210 to provide an attachment location for UHF RFID IC 330.

Figure 3B:
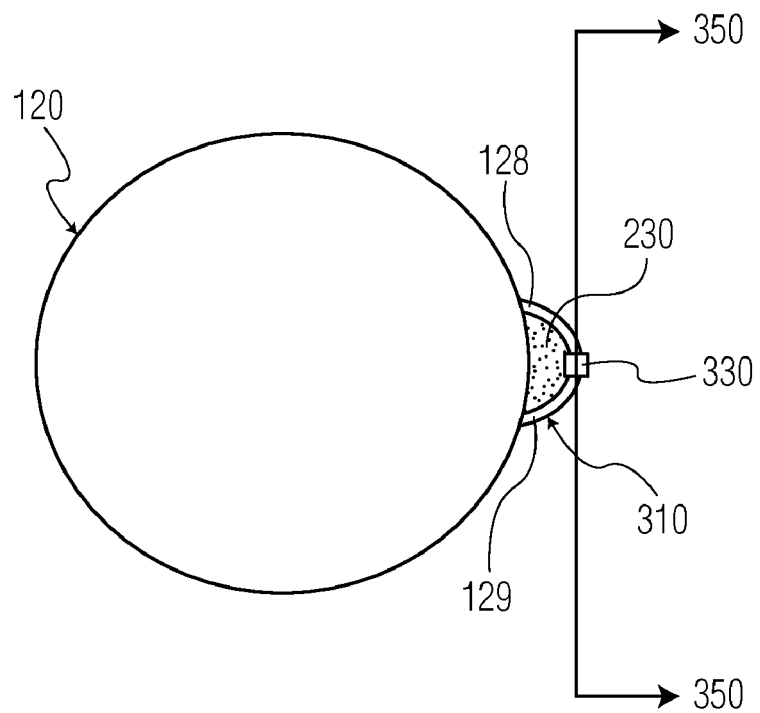
FIG. 3b shows an embodiment in accordance with the invention.

UHF RFID matching network 310 functions to match the impedance of disposable metal cover 120 to UHF RFID IC 330 as shown in FIG. 3b. Maximum power is delivered from the RFID reader to disposable metal cover 120 when the input impedance of disposable metal cover 120 is the complex conjugate of the impedance of UHF RFID IC 330 (conjugate impedance matching). A typical complex impedance for UHF RFID IC 330 is, for example, $(10-150j)\Omega$. UHF RFID IC 330 may be directly attached to UHF matching network 310 (see FIG. 4) or to UHF RFID STRAP carrier 520 which is attached to UHF matching network 310 (see FIG. 5).

Figure 3C:
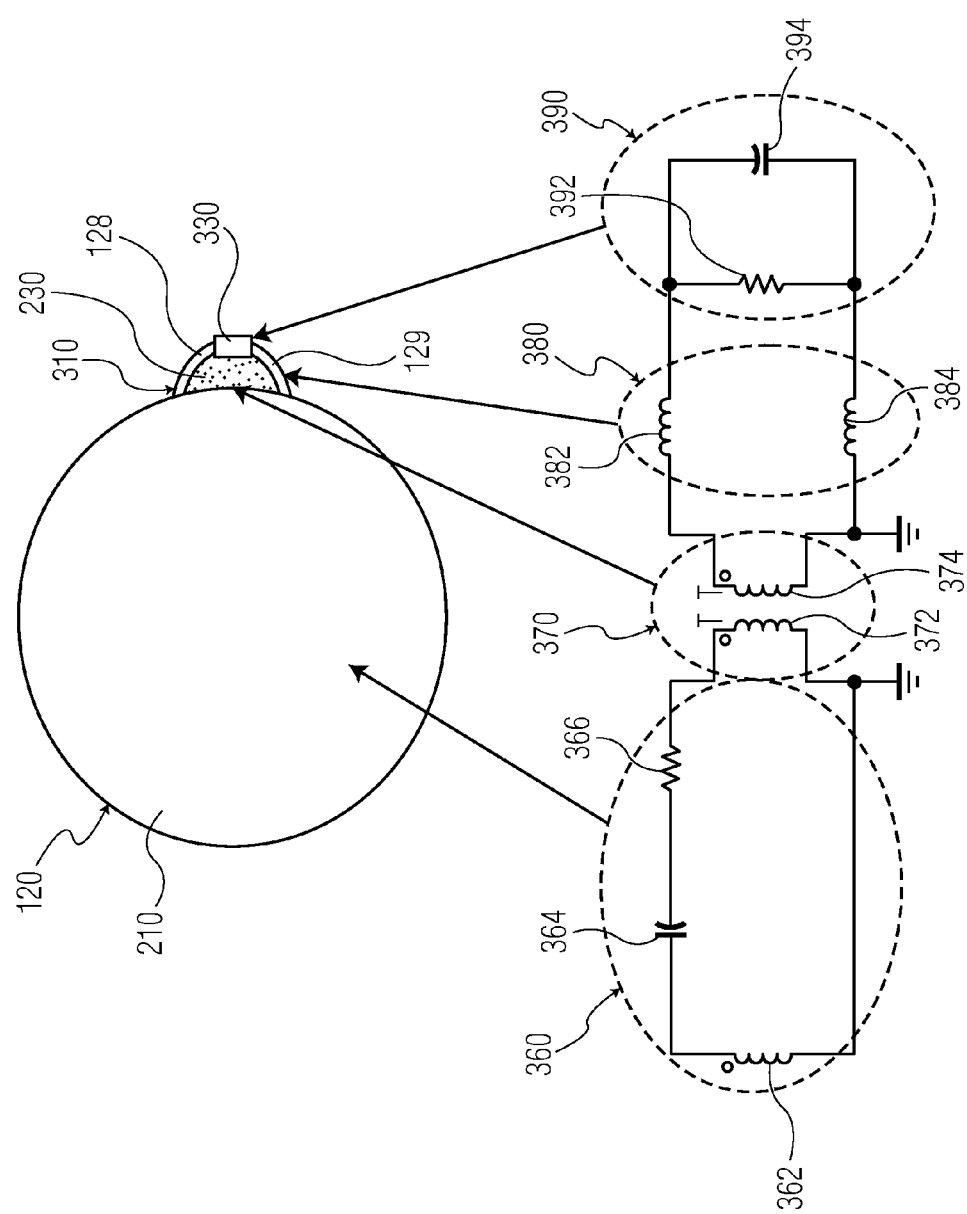
FIG. 3c shows an embodiment in accordance with the invention.

FIG. 3c shows the relationship of an embodiment in accordance with the invention to an equivalent circuit model. Equivalent circuit model 360 corresponds to disposable metal cover 120 which functions as a UHF RFID antenna having inductance 362, capacitance 364 and resistance 366. In accordance with the invention, typical values for inductance 362 are in the range from about 30 nH to about 50 nH, typical values for capacitance 364 are in the range from about 0.2 pF to about 2 pF and typical values for resistance 366 are in the range from about $5\Omega$ to about $100\Omega$ at the operating frequency that is typically about 915 MHz.

Equivalent circuit model 370 shows the "T-match" configuration that is created by T-match arms 128 and 129 together with disposable metal cover 120. The "T-match" configuration acts as an impedance transformer to match the impedance of disposable metal cover 120 to UHF RFID IC 330. The impedance transformer in equivalent circuit model 370 is typically adjusted by controlling the area of insulating substrate 230 enclosed by arms 128 and 129 (e.g. making the arms 128 and 129 wider or narrower as well as longer or shorter). For example, the input impedance may be increased if the width of arms 128 and 129 is decreased. The impedance step up ratio provided by inductors 372 and 374 depends on the current division factor between metal cover 120 and arms 128 and 129. Details regarding "T-match" configurations may be found in "The art of UHF RFID antenna design: impedance matching and size reduction techniques" by Gaetano Marrocco, IEEE Antennas and Propagation Magazine, Vol. 50, No. 1, pp. 66-79, 2008 which is hereby incorporated by reference in its entirety.

Equivalent circuit model 380 corresponds to inductances 382 and 384 of metal arms 128 and 129, respectively, on tab 130 that connect UHF RFID IC 330 to disposable metal cover 120. A typical value for inductances 382 and 384 is on the order of about 10 nH. Finally, equivalent circuit model 390 corresponds to resistance 392 and capacitance 394 of UHF RFID IC 330. A typical value for resistance 392 is on the order of about 2 K$\Omega$ and a typical value for capacitance 394 is on the order of about 1 pF.

Figure 4:
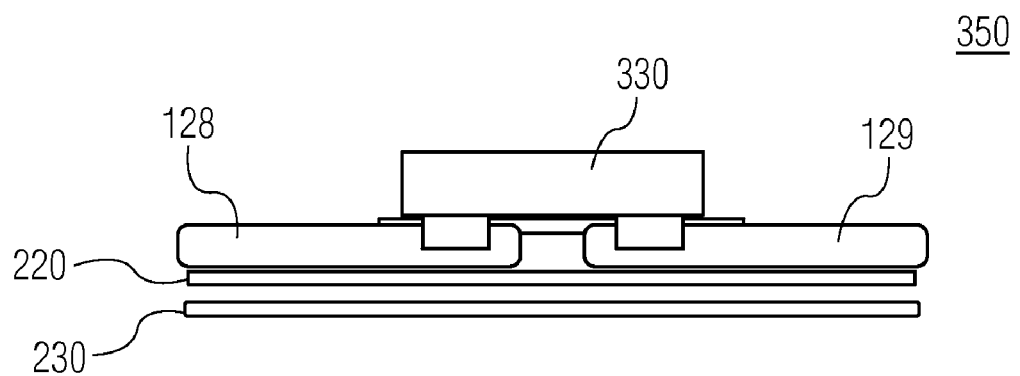
FIG. 4 shows an embodiment in accordance with the invention.

In accordance with an embodiment of the invention, FIG. 4 shows UHF RFID IC 330 directly attached to arms 128 and 129 in cross-sectional view 350 (see FIG. 3b) to provide a connection for UHF RFID IC 330 to matching network 310. Matching network 310 is attached to insulating layer 230 by glue layer 220.

Figure 5:
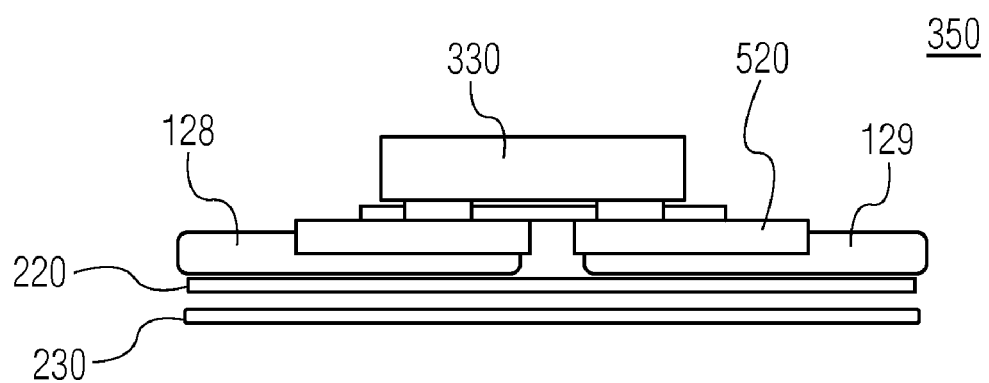
FIG. 5 shows an embodiment in accordance with the invention.

In accordance with an embodiment of the invention, FIG. 5 shows the use of UHF RFID STRAP carrier 520 to connect UHF RFID IC 330 to matching network 310 in cross-sectional view 350 (see FIG. 3b). UHF RFID STRAP carrier 520 is attached to arms 128 and 129 which form a matching loop structure. Note that in accordance with the invention, the shape does not need to be a loop and could be, for example, semi-rectangular. Arms 128 and 129 are attached to insulating layer 230 by glue layer 220. UHF RFID IC 330 is typically directly attached to UHF RFID STRAP carrier 520.

Figure 6A:
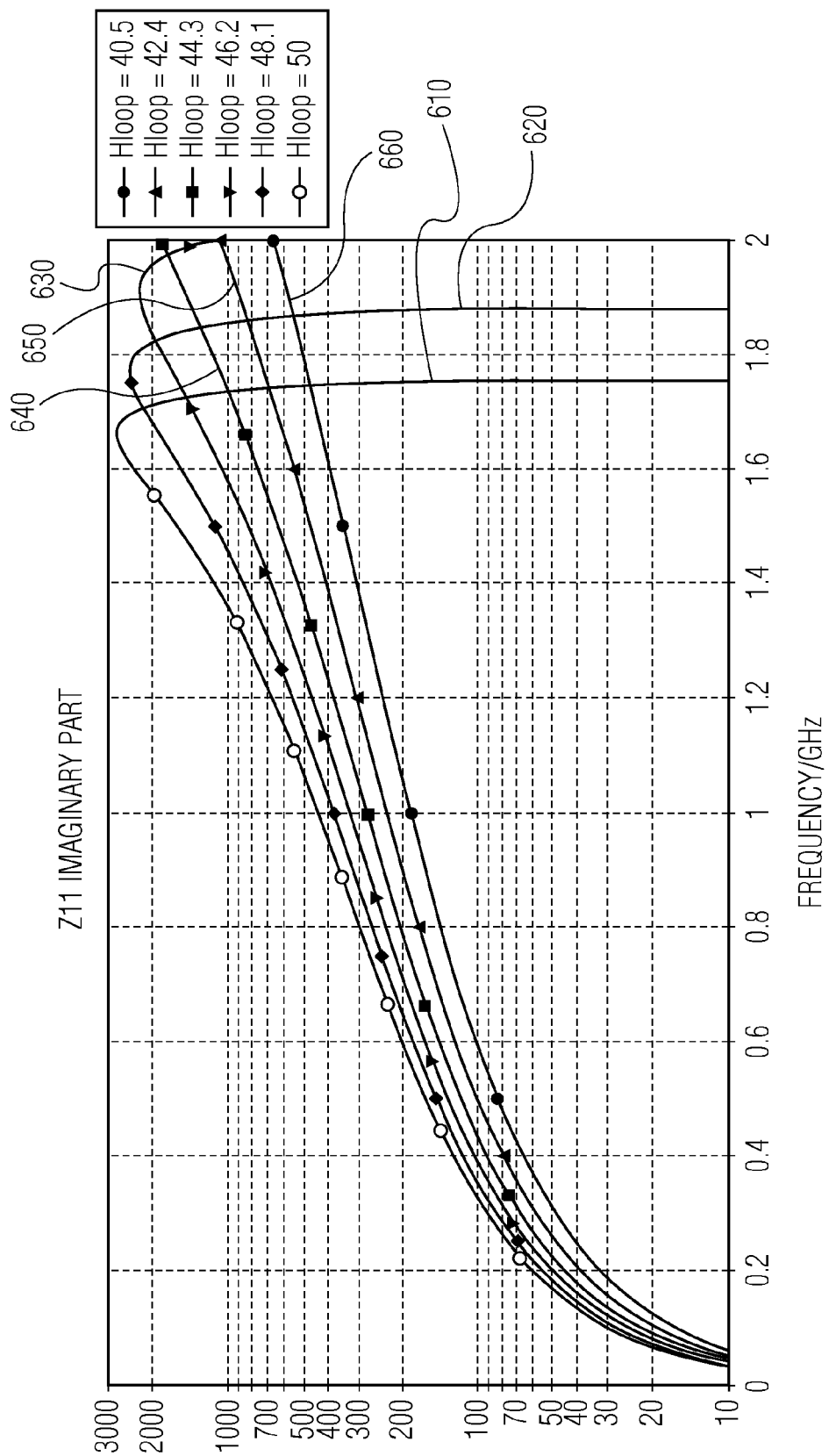
FIG. 6a shows a graph of values of the imaginary impedance of the matching network for embodiments in accordance with the invention.

In accordance with the invention, FIG. 6a shows the imaginary value of the complex impedance as a function of frequency at notch 127 for six different distances of the center of notch 127 on tab 130 from the perimeter of disposable metal cover 120 having a diameter on the order of about 50 mm. (e.g see FIG. 3a). All other values are fixed so that arms 128 and 129 enclose less area as the location of notch 127 is moved inward a total of about 9.5 mm and the imaginary impedance decreases as the inductance is reduced. Notch 127 is successively moved in by about 1.9 mm. Curve 610 shows the imaginary impedance as a function of frequency at notch 127 for the reference position where notch 127 is about 15.5 mm away from the perimeter of disposable metal cover 120. Curve 620 shows the imaginary impedance as a function of frequency at notch 127 where notch 127 is about 1.9 mm closer to the perimeter of disposable metal cover 120 than for curve 610. Curve 630 shows the imaginary impedance as a function of frequency at notch 127 where notch 127 is about 1.9 mm closer to the perimeter of disposable metal cover 120 than for curve 620. Curve 640 shows the imaginary impedance as a function of frequency at notch 127 where notch 127 is about 1.9 mm closer to the perimeter of disposable metal cover 120 than for curve 630. Curve 650 shows the imaginary impedance as a function of frequency at notch 127 where notch 127 is about 1.9 mm closer to the perimeter of disposable metal cover 120 than for curve 640. Curve 660 shows the imaginary impedance as a function of frequency at notch 127 where notch 127 is about 1.9 mm closer to the perimeter of disposable metal cover 120 than for curve 650 and notch 127 is a distance of about 6 mm away from the perimeter of disposable metal cover 120 for curve 660.

Figure 6B:
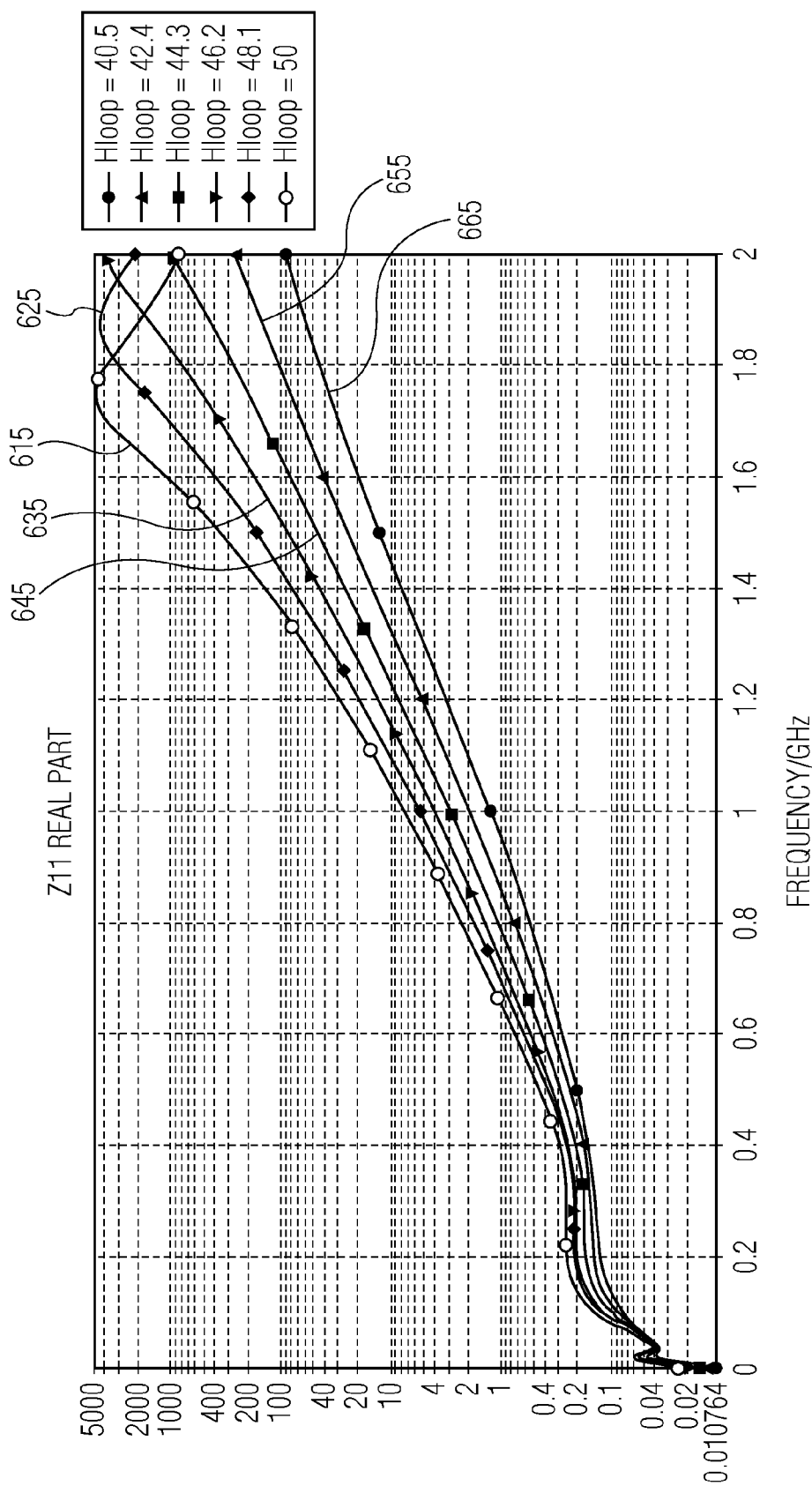
FIG. 6b shows a graph of values of the real impedance of the matching network for embodiments in accordance with the invention.

In accordance with the invention, FIG. 6b shows the real value of the complex impedance as a function of frequency at notch 127 for six different distances of the center of notch 127 on tab 130 from the perimeter of disposable metal cover 120 having a diameter on the order of about 50 mm (e.g see FIG. 3a). All other values are fixed so that arms 128 and 129 enclose less area as the location of notch 127 is moved inward a total of about 9.5 mm and the real impedance decreases as the inductance is reduced. Notch 127 is successively moved in by about 1.9 mm. Curve 615 shows the real impedance as a function of frequency at notch 127 for the reference position where notch 127 is about 15.5 mm away from the perimeter of disposable metal cover 120. Curve 625 shows the real impedance as a function of frequency at notch 127 where notch 127 is about 1.9 mm closer to the perimeter of disposable metal cover 120 than for curve 615. Curve 635 shows the real impedance as a function of frequency at notch 127 where notch 127 is about 1.9 mm closer to the perimeter of disposable metal cover 120 than for curve 625. Curve 645 shows the real impedance as a function of frequency at notch 127 where notch 127 is about 1.9 mm closer to the perimeter of disposable metal cover 120 than for curve 635. Curve 655 shows the real impedance as a function of frequency at notch 127 where notch 127 is about 1.9 mm closer to the perimeter of disposable metal cover 120 than for curve 645. Curve 665 shows the real impedance as a function of frequency at notch 127 where notch 127 is about 1.9 mm closer to the perimeter of disposable metal cover 120 than for curve 655 and notch 127 is a distance of about 6 mm away from the perimeter of disposable metal cover 120 for curve 665.

As will be apparent to those skilled in the art, in accordance with the invention other impedance matching techniques may be used, such as nested shape slot techniques which typically require a different location for the attachment of the UHF RFID IC to the disposable metal cover.

While the invention has been described in conjunction with specific embodiments, it is evident to those skilled in the art that many alternatives, modifications, and variations will be apparent in light of the foregoing description. Accordingly, the invention is intended to embrace all other such alternatives, modifications, and variations that fall within the spirit and scope of the appended claims.

The invention claimed is:

1. A UHF RFID antenna system comprising:
    a disposable metal cover comprising a metal layer and an insulating layer; and
    a tab integrally formed with said disposable metal cover such that said tab shares a portion of said metal layer and a portion of said insulating layer with said disposable metal cover, said tab having part of said portion of said metal layer removed to form a matching loop electrically coupled to said disposable metal cover.

2. The UHF RFID antenna system of claim 1 further comprising a container affixed to said disposable metal cover.

3. The UHF RFID antenna system of claim 1 wherein said container is comprised of a material selected from the group containing foam, plastic, metal and cardboard.

4. The UHF RFID antenna system of claim 1 wherein said insulating layer is comprised of PET.

5. The UHF RFID antenna system of claim 1 wherein said metal cover is comprised of aluminum.

6. The UHF RFID antenna system of claim 1 wherein said matching loop is comprised of a first arm and a second arm, sad first arm and said second arm being electrically coupled and directly attached to a UHF RFID IC.

7. The UHF RFID antenna system of claim 1 wherein said matching loop is comprised of a first arm and a second arm, said first arm and said second arm being electrically coupled to and directly attached to a UHF RFID STRAP carrier.

8. The UHF RFID antenna system of claim 1 wherein said UHF RFID STRAP carrier is electrically coupled to a UHF RFID IC.

9. The UHF RFID antenna system of claim 1 wherein said disposable metal cover has a generally circular shape.

10. A method for making a UHF RFID antenna system comprising:
    providing a disposable metal cover comprising a metal layer and an insulating layer; and
    providing a tab integrally formed with said disposable metal cover such that said tab shares a portion of said metal layer and a portion of said insulating layer with said disposable metal cover, said tab having part of said portion of said metal layer removed to form a matching loop electrically coupled to said disposable metal cover.

11. The method of claim 10 further comprising providing a container and attaching it to said disposable metal cover.

12. The method of claim 11 wherein said container is comprised of a material selected from the group containing foam, plastic, metal and cardboard.

13. The method of claim 10 wherein said insulating layer is comprised of PET.

14. The method of claim 10 wherein said metal cover is comprised of aluminum.

15. The method of claim 10 wherein said matching loop is comprised of a first arm and a second arm, said first arm and said second arm being electrically coupled to and directly attached to a UHF RFID IC.

16. The method of claim 10 wherein said matching loop is comprised of a first arm and a second arm, said first arm and said second arm being electrically coupled to and directly attached to a UHF RFID STRAP carrier.

17. The method of claim 10 wherein said disposable metal cover has a generally circular shape.

18. A UHF RFID antenna system comprising:
    a disposable metal cover comprising a metal layer and an insulating layer; and
    a tab integrally formed with said disposable metal cover such that said tab shares a portion of said metal layer and a portion of said insulating layer with said disposable metal cover, said tab having part of said portion of said metal layer removed to form a first arm and second arm, said first and said second arm being electrically coupled to said disposable metal cover.

19. The UHF RFID antenna system of claim 18 wherein said first and said second arm are electrically coupled to and directly attached to a UHF RFID IC.

20. The UHF RFID antenna system of claim 18 wherein said disposable metal cover is comprised of aluminum.

* * * * *